(12) United States Patent
Cahana

(10) Patent No.: US 12,441,446 B2
(45) Date of Patent: Oct. 14, 2025

(54) LIGHTWEIGHT, ADJUSTABLE BUOYANCY SCUBA UNIT

(71) Applicant: Aviad Cahana, Kula, HI (US)

(72) Inventor: Aviad Cahana, Kula, HI (US)

( * ) Notice: Subject to any disclaimer, the term of this patent is extended or adjusted under 35 U.S.C. 154(b) by 634 days.

(21) Appl. No.: 17/971,232

(22) Filed: Oct. 21, 2022

(65) Prior Publication Data

US 2023/0060077 A1 Feb. 23, 2023

Related U.S. Application Data

(63) Continuation-in-part of application No. 16/097,836, filed as application No. PCT/US2017/034896 on May 28, 2017, now Pat. No. 11,541,975.

(60) Provisional application No. 62/354,342, filed on Jun. 24, 2016.

(51) Int. Cl.
*B63C 11/00* (2006.01)
*B63C 11/22* (2006.01)
*B63C 11/02* (2006.01)

(52) U.S. Cl.
CPC ..... *B63C 11/2245* (2013.01); *B63C 2011/027* (2013.01)

(58) Field of Classification Search
CPC .................................................. B63C 11/2245
See application file for complete search history.

(56) References Cited

U.S. PATENT DOCUMENTS

| | | |
|---|---|---|
| 3,695,048 A | 10/1972 | Dimick |
| 4,114,389 A | 9/1978 | Bohmrich |
| 4,779,554 A | 10/1988 | Courtney |
| 4,872,783 A | 10/1989 | Greenwood |
| 5,221,161 A | 6/1993 | Toy |
| 5,496,136 A | 3/1996 | Egan |
| 5,660,503 A | 8/1997 | Lewis |
| 2007/0248419 A1 | 10/2007 | Uliel |
| 2010/0304629 A1 | 12/2010 | Onofri |
| 2017/0170486 A1 | 6/2017 | Zheng et al. |
| 2018/0001980 A1 | 1/2018 | Hulbert |
| 2021/0300510 A1 | 9/2021 | Cahana |

FOREIGN PATENT DOCUMENTS

| | | |
|---|---|---|
| GB | 1532411 | 11/1978 |
| GB | 2495147 | 4/2013 |
| WO | WO 2012/073749 | 6/2012 |

OTHER PUBLICATIONS

U.S. Appl. No. 16/097,836 (and related prosecution), filed Sep. 5, 2019, Cahana.
U.S. Appl. No. 17/878,638, filed Aug. 1, 2022, Cahana.

*Primary Examiner* — LaToya M Louis
(74) *Attorney, Agent, or Firm* — V Gerald Grafe

(57) ABSTRACT

Conventional SCUBA diving equipment is heavy and cumbersome, mainly due to the mass and size of the breathing gas carrier, i.e. the pressure vessel. A preferred pressure vessel for SCUBA diving can be as light as possible and neutrally buoyant at all stages of the dive. To achieve such preferred characteristics, the pressure vessel volume can be adjusted in accordance with the change in its mass. The present invention provides SCUBA systems that provides for the preferred characteristics.

20 Claims, 8 Drawing Sheets

LIGHTWEIGHT, ADJUSTABLE BUOYANCY SCUBA UNIT

CROSS-REFERENCE TO RELATED APPLICATIONS

This application claims priority to U.S. provisional application 62/354,342, filed 24 Jun. 2016, which is incorporated herein by reference.

BACKGROUND OF THE INVENTION

The SCUBA diving industry had made significant technical progress in most areas. The common SCUBA pressure vessel, however, is still very heavy and cumbersome to maneuver. Equipment handling is considered the highest barrier for maintaining SCUBA as a long-term hobby by the leading SCUBA certification agencies. The weight of a common SCUBA pressure vessel and its size reduces ease of access to diving locations, increase risk of SCUBA equipment handling related injuries and is costly to transport on land, air and sea.

Modern materials such as carbon fiber, composites, fiberglass and polymer-based materials can function as well as or better than steel or aluminum to contain the breathing gas mixture pressure at a much lighter weight. However, simply using lighter materials does not solve the problem because it only deals with one of the forces operating on a submerged object.

Gravity facilitates the downward force operating on a SCUBA pressure vessel. The total mass of the SCUBA pressure vessel can be considered as comprising two components. The first component is its construction-related mass: a pressure vessel made of steel or aluminum is usually heavier than a pressure vessel made of lighter material such as composites, carbon fiber, etc. The second component is the mass of the breathing gas mixture.

The upward force operating on a SCUBA pressure vessel is a function of its volume and the density of the liquid it is submerged in. Archimedes' principle states that the upward buoyant force that is exerted on a body immersed in a fluid is equal to the weight of the fluid that the body displaces. A standard SCUBA pressure vessels have fixed volume. Hence, it displaces a fixed amount of water and the upward force is constant. FIG. 1 shows an illustration of these forces.

Two of the three components influencing the vertical position of a conventional pressure vessel while submerged remain constant through the dive: its construction related mass and its total volume. The third component is the total mass of the breathing gas. As the diver consumes the breathing gas throughout the dive, the mass of the breathing gas inside the SCUBA pressure vessel is reduced. For this reason, standard SCUBA pressure vessels are heavier at the beginning of the dive than at its end. As a result, SCUBA divers take additional weight with them to maintain buoyancy towards the end of the dive.

New materials allow for a substantial mass reduction of a conventional SCUBA pressure vessel. The caveat is that mass reduction in such SCUBA applications means increased buoyancy by an equal force. A lightweight pressure vessel that is neutrally buoyant at the beginning of the dive will be overly buoyant at the end of the dive, unless the diver takes additional weight. Doing so defeats the purpose of reducing the SCUBA pressure vessel by using lighter materials of construction.

There is a need for SCUBA pressure vessels that do not require extra weight to maintain buoyancy during a dive.

SUMMARY OF THE INVENTION

The present invention addresses the problem of changing pressure vessel buoyancy by providing for adjustment of the pressure vessel volume, for example in proportion to the loss of the breathing gas mass during a dive. Embodiments of the present invention comprise a variable volume pressure vessel, and a mechanism that adjusts the volume of the pressure vessel so that it maintains the desired buoyancy as the mass of breathing gas changes.

Embodiments of the present invention can provide multiple advantages over conventional systems. They can be easier and safer to handle and transport. They can be more easily adjusted to attain desired buoyancy. They can allow longer bottom times: since the system self-balances its buoyancy, placing more air mass into the vessel does not translate into a higher buoyancy penalty at the end of the dive.

Embodiments of the present invention provide an adjustable buoyancy system for use with a self-contained breathing apparatus configured for use with breathing gas while a user is submerged in a fluid, comprising a vessel comprising an outer shell defining an interior volume; a dynamic partitioning element mounted within the interior volume separating the interior volume into a breathing gas portion and a fluid portion; a fluid pressurization element in fluid communication with the fluid portion of the vessel and having an inlet configured to accept fluid, configured to communicate fluid from the inlet into the fluid portion. In some embodiments, the dynamic partitioning element comprises one or more of: a piston slidably mounted within the vessel, a flexible bladder, and a flexible sheet mounted within the vessel and sealed to the vessel walls. In some embodiments, the dynamic partitioning element is substantially impermeable to the breathing gas and to the fluid. In some embodiments, the fluid pump comprises one or more of a manually actuated hydraulic pump, and a pneumatically actuated pump. The pneumatically actuated pump can have a gas inlet for accepting pressurized gas to drive the pump, and wherein the gas inlet is in communication with the breathing gas portion of the vessel. The pneumatically actuated pump can be configured such that exhaust from the pump at a regulated pressure compatible with breathing by a user, or with conventional breathing regulators.

DETAILED DESCRIPTION OF THE INVENTION

Figure 1:
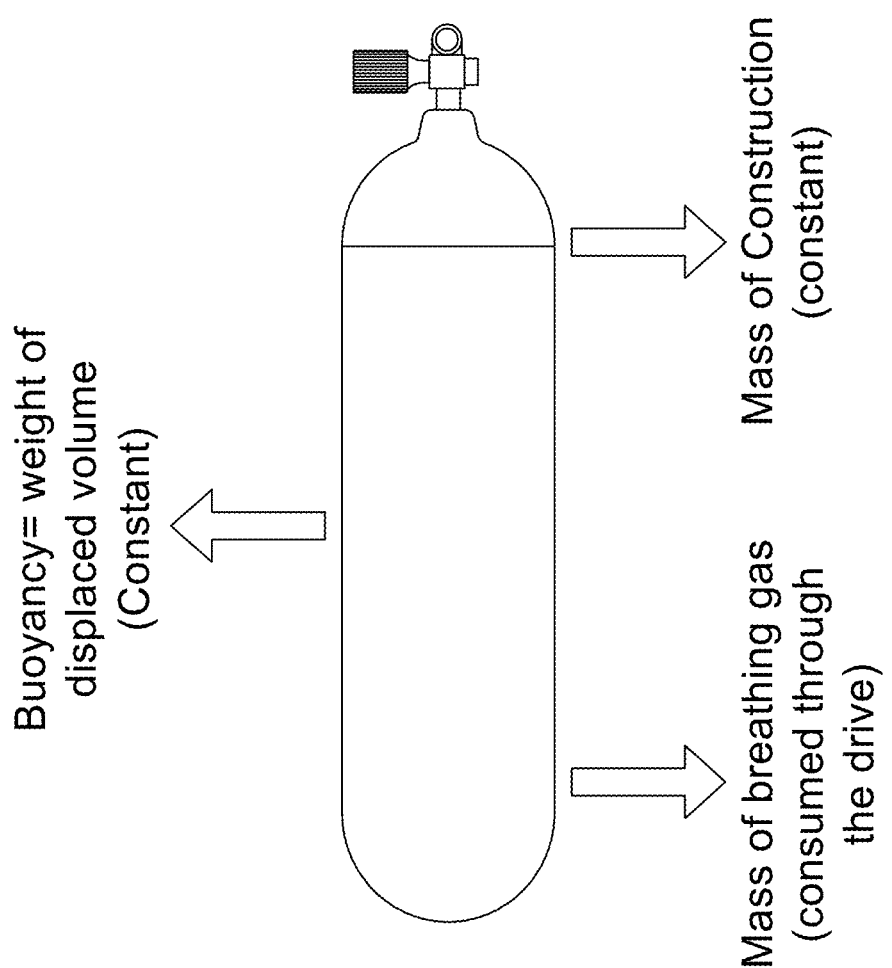
FIG. 1 is a schematic illustration of the forces affecting an object's buoyancy while submerged.

Embodiments of the present invention provide an adjustable buoyancy system for use with a self-contained breathing apparatus configured for use with breathing gas while a user is submerged in a fluid, comprising a vessel comprising an outer shell defining an interior volume; a dynamic partitioning element mounted within the interior volume separating the interior volume into a breathing gas portion and a fluid portion; a fluid pressurization element in fluid communication with the fluid portion of the vessel and having an inlet configured to accept fluid, configured to communicate fluid from the inlet into the fluid portion. In some embodiments, the dynamic partitioning element comprises one or more of: a piston slidably mounted within the vessel, a flexible bladder, and a flexible sheet mounted within the vessel and sealed to the vessel walls. In some embodiments, the dynamic partitioning element is substantially impermeable to the breathing gas and to the fluid. In some embodiments, the fluid pump comprises one or more of a manually actuated hydraulic pump, and a pneumatically actuated pump. The pneumatically actuated pump can have a gas inlet for accepting pressurized gas to drive the pump, and wherein the gas inlet is in communication with the breathing gas portion of the vessel. The pneumatically actuated pump can be configured such that exhaust from the pump at a regulated pressure compatible with breathing by a user, or with conventional breathing regulators.

Some embodiments further comprise an electrical energy storage device, and the pump comprises an electric pump configured to accept energy from the electrical energy storage device. Some embodiments further comprise a meter configured to indicate the amount of breathing gas in the breathing gas portion of the vessel. The meter can comprise one or more of: a gas flow meter in fluid communication with the breathing gas portion of the vessel, a fluid flow meter mounted in fluid communication with the pump and with the fluid portion of the vessel, responsive to fluid flow through the pump. Some embodiments further comprise a pressure gauge in fluid communication with the breathing gas portion of the vessel. Some embodiments further comprise a sensor indicative of the relative volumes of the breathing gas portion of the vessel and the fluid portion of the vessel. The sensor can comprise a sensor mounted with the dynamic partitioning element. The sensor can comprise a sensor mounted with the vessel responsive to the position of the dynamic partitioning element.

Some embodiments further comprise a breathing gas regulator in fluid communication with the breathing gas portion of the vessel and configured to supply breathing gas at a regulated pressure to a user while submerged. In some embodiments, the pump comprises a pneumatically actuated pump, and the pneumatically actuated pump accepts air from the breathing gas portion of the vessel, and outputs air that is then accepted by the breathing gas regulator. In some embodiments, the liquid delivery system is configured such that the mass of liquid communicated into the liquid portion is in a pre-determined proportion to the mass of breathing gas removed from the breathing gas portion The present invention provides pressure vessel systems that can introduce fluid into a fluid chamber, consequently reducing the effective volume of the pressure vessel system. According to Archimedes' principle, as the volume of liquid displaced by the body is reduced, the buoyancy of the body is reduced. Embodiments of the present invention control the mass ratio of gas-out vs. liquid-in to maintain desired buoyancy. As used in herein, Gas-out is the mass of gas that has been removed from the pressure vessel, and Liquid-in is the mass of liquid that is placed and maintained inside the fluid chamber of the pressure vessel system.

For the purpose of this invention, the fluid can comprise seawater, fresh water or any liquid medium in which the SCUBA diver is submersed. Using the liquid surrounding the diver can be important since it is an abundant and free source of mass. Since water density is roughly 1 kilogram per liter, a convenient starting point for the gas-out:liquid-in mass ratio is 1:1. For example, if 5 grams of breathing gas were removed from the gas side (gas-out), 5 grams of liquid medium are delivered into the liquid portion of the pressure vessel (liquid-in) to maintain the desired buoyancy.

Figure 2:
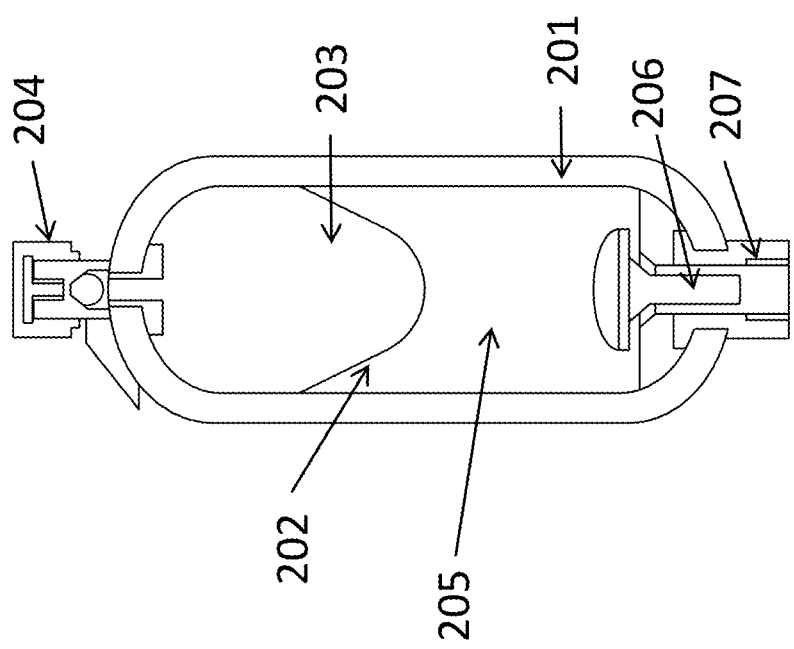
FIG. 2 is a schematic illustration of an example embodiment of the present invention.

FIG. 2 is a schematic illustration of an example embodiment of the present invention, comprising a bladder-type lightweight variable volume SCUBA tank. A pressure vessel system comprises a lightweight cylinder 201 with a bladder 202 disposed therein. A breathing gas mixture 203 is contained within the bladder, and communicated to a diver via a breathing mixture gas valve port 204. A portion of the lightweight cylinder not occupied by the bladder forms a fluid chamber 205. Fluid can be communicated between the fluid chamber and the surrounding fluid via a poppet 206 and a fluid port 207.

Figure 3:
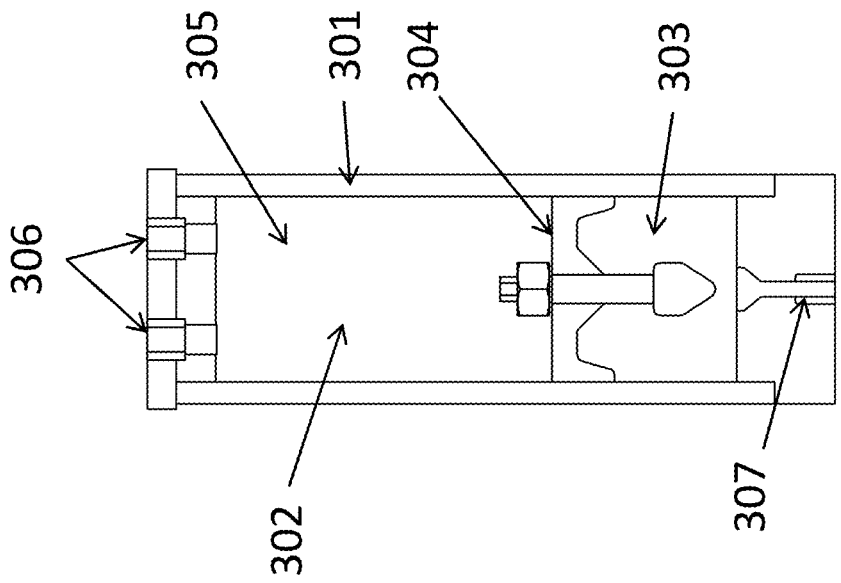
FIG. 3 is a schematic illustration of an example embodiment of the present invention.

FIG. 3 is a schematic illustration of an example embodiment of the present invention, comprising a piston-type variable volume SCUBA tank. A lightweight cylinder 301 defines and internal volume that is separated into first 302 and second portions 303 by a piston 304 slidably mounted within the internal volume. The first portion 302 contains a breathing gas mixture 305. The second portion 303 forms a fluid chamber for containing fluid. The breathing gas mixture 305 can be communicated to a diver via one or more breathing mixture gas valve ports 306. Fluid can be communicated between the fluid chamber 303 and the surrounding fluid via a fluid port 307.

The example embodiments in FIG. 2 and FIG. 3 are only examples and presented to illustrate the pressure vessel. The invention includes but is not limited to those specific pressure vessel designs or those specific variable volume pressure vessels. Construction of embodiments of the invention can consider ease of service and maintenance in the sizing and configuration of the various elements.

In the setting of a variable volume pressure vessel, the governing parameter controlling the pressure vessel buoyancy throughout a dive is the mass ratio of gas-out:liquid-in. Embodiments of the invention can use any of several ways to adjust the effective volume of the pressure vessel. Examples are described below.

Pneumatic-hydraulic devices. These fluid power devices are powered by gas to communicate liquids between a reservoir (e.g., the liquid surrounding the diver) and the pressure vessel. For example, a pneumatic-hydraulic pump can use the breathing gas itself as the power source to communicate the appropriate amount of liquid into the liquid chamber of the pressure vessel.

Mechanical-hydraulic devices. Devices that use energy stored in mechanical instruments to communicate liquids between a reservoir and the pressure vessel. An example is a spring or spring system, able to deliver power into the hydraulic device so that the appropriate amount of liquid will be delivered into the liquid side of the pressure vessel.

Chemical-hydraulic devices. Devices that use chemical energy to communicate liquids between a reservoir and the pressure vessel. The chemical energy can be stored in reactants that can be brought together to produce an expanding gas capable of delivering the required energy. Another example of a device that uses chemical energy is a manual hand pump. The energy driving the pump comes from the body of the diver.

Electrical-hydraulic devices. Devices that use electrical energy stored in a battery or manufactured via an electromagnetic apparatus to communicate liquids between a reservoir and the pressure vessel. An example is a battery-driven pump.

For each of the methodologies describes above, a proper response curve can be developed so that the amount of air leaving the pressure vessel is compensated by a proportional amount of liquid communicated into the liquid chamber of the pressure vessel. As mentioned above, if neutral buoyancy is desired the gas-out:liquid-in mass ratio should be maintained at about 1:1.

Remaining Air Monitoring System

Conventional SCUBA systems use a submersible pressure gauge (analogue, digital, integrated by hose or wirelessly) to monitor the pressure in the pressure vessel. This is a very important safety element of each dive protocol. Monitoring the remaining air pressure allows the diver to plan the remainder of the dive and properly respond to diversions from the dive plan.

A diver knows how much breathing mixture is left in their pressure vessel by using the following formula:

Pressure reading (in Bars)×pressure vessel inner volume (in Liters)=Liters of breathing mixture remaining Conventional SCUBA pressure vessels have fixed inner volumes. Hence a pressure reading can easily be correlated to the amount of breathing mixture remaining. This simple correlation is not as suitable with the present invention, since the pressure vessel in the present invention can have a variable volume. The changing volume of the pressure vessel, can be considered in monitoring the remaining breathing gas amount. Measuring the change in volume can be done in several ways (or a combination thereof), such as the examples described below.

Monitoring the position of the bladder or piston. A sensor can be mounted in the pressure vessel or on the pressure vessel wall, calibrated to the level of the piston or the bladder and transmitting a signal to a digital or analogue device. The signal can be read directly or further converted to an "amount of air remaining" reading or a "minutes of air at current depth". Both of the preceding are common in current air-integrated SCUBA computers.

Monitoring the amount of liquid inside the liquid chamber of the pressure vessel. In the example embodiments described above, the current gas chamber volume is equal to the initial gas chamber volume minus the current liquid volume in the liquid chamber. The current liquid volume in the liquid chamber can be determined using liquid flow meters, analogue or digital. The reading can be presented directly to the diver or signaled to a computer, which will calculate the amount of remaining air in any desired presentation form to the diver.

The remaining breathing air mixture can be determined in other ways, such as the examples described below.

Directly using a gas flow meter, analogue or digital. Such gas flow meters are commonly used in the industry today. A gas flow meter can be installed in any of the gas passages within the SCUBA system, so long as it is monitoring the gas consumed by the diver for any purpose. As an example, a gas flow meter can be installed between the pressure vessel gas valve and the regulator.

Indirectly using pressure sensors. Pressure sensors installed in various points in the system where pressure changes are occurring can allow for calibration of the pressure drop signals to indicate how much gas is leaving the tank. If one knows how much gas is consumed per one pressure drop, and how many pressure drops are in total, the multiplication product of the two allows determination of how much gas has left the pressure vessel.

Estimating the amount of remaining breathing mixture can be done using calculated pressure adjustments. With this approach, the pressure reading from a submersible pressure gauge of a variable volume pressure vessel is mathematically converted to a correlated value representing the reading that would have been obtained from a fixed volume pressure vessel. To do so, one can generate two curves:

First Curve. Estimated pressure reading from a fixed volume pressure vessel as a function of elapsed dive time: using a given diver breathing rate, the remaining mass of the breathing mixture can be calculated as a function of elapsed dive time. Using the known volume of the pressure vessel, the remaining breathing mixture mass value can be converted to a pressure value as a function of elapsed dive time.

Second Curve. Estimated pressure reading from a variable volume pressure vessel as a function of elapsed dive time: given a variable volume pressure vessel with the same initial breathing mixture gas mass as the fixed volume pressure vessel described in First Curve above. The remaining mass of the breathing mixture can be plotted as a function of elapsed dive time. For a given mass ratio of gas-out:liquid-in, the pressure of the variable volume pressure vessel can be plotted as a function of elapsed dive time.

The pressure curves resulting from the two curves above can be plotted on an x-y chart and the mathematical relationship represented as a function. The function can be then used to obtain an approximate pressure adjustment. Such adjustment can be used by a diver to convert a pressure reading from a system according to the present invention to a pressure reading that would have been obtained under the same circumstances from a conventional SCUBA unit. While this is an approximate value, it is a simple and useful way to monitor the remaining amount of breathing mixture using pressure readings that are already familiar to SCUBA divers.

Figure 4:
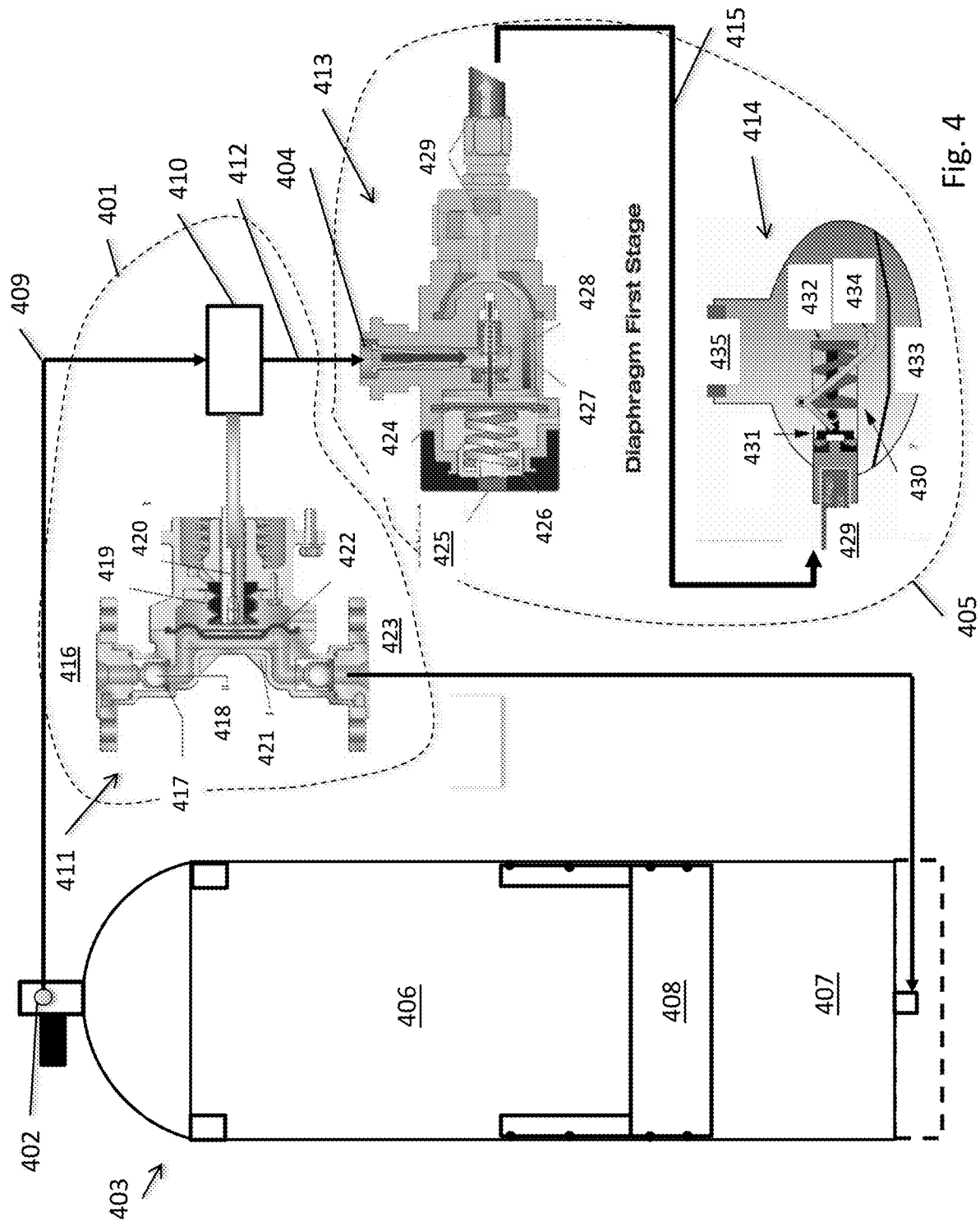
FIG. 4 is a schematic illustration of an example embodiment of the present invention.

FIG. 4 is a schematic illustration of an example embodiment of the present invention. The example embodiment comprises a pneumatic-hydraulic pump 401 installed between a gas outlet 402 of a pressure vessel 403 and a high-pressure inlet 404 of a SCUBA regulator 405. A pressure vessel provides a portion 406 for a breathing gas mixture and portion 407 for pressurized water, separated by a rigid separator 408 that can be configured to provide for variable volumes of the two portions; in the example in the figure the separator 408 can be slid along the interior of the pressure vessel, decreasing the volume of one portion while increasing the volume of the other portion. High pressure air from the pressure vessel is communicated via a hose 409 to an air motor 410. The air motor 410 can comprise, as examples, a rotary vane motor, gear motor, swash plate or any other pneumatic means to power a pump. A water pump 411 accepts water from the surroundings and pressurizes it for communication to the pressurized water portion 407 of the pressure vessel 403. The air drive 410 and water pump 411 can be configured so that a given mass of air transiting the air drive 410 corresponds to an equal mass of water pumped into the pressure vessel 403, maintaining the desired buoyancy. Air from the air drive 410 is communicated via hose 412 to a SCUBA regulator's first stage 413, which reduces the pressure of the air. Air from the first stage 413 is communicated via hose 415 to a demand valve 414, commonly known in the SCUBA industry as the regulator's second stage. The first and second stage of the SCUBA regulator can be those known in the art, as examples any commonly used regulator, balanced or non-balanced, piston or diaphragm, etc.

In the example shown in the figure, the water pump comprises an inlet 416 for ambient water, a valve seal 417, two check ball valves 418, an accordion 419, a pump shaft 420, a pump head 421, a diaphragm 422, and an outlet 423 for high pressure water, connected as shown in the figure and as known in the art. The regulator's first stage comprises an inlet 404 for high pressure air, a diaphragm 424, an inlet for ambient water pressure 425, a main spring 426, an intermediate chamber 427, a valve and high pressure seat 428, and an outlet for intermediate pressure 429 to second stage, connected as shown in the figure and as known in the art. The second stage regulator comprises an inlet 429 for air, a poppet assembly 430, a valve seat 431, a bias spring 432, a diaphragm 433, a demand lever 434, and an outlet 435 to the diver, connected as shown in the figure and as known in the art.

Figure 5:
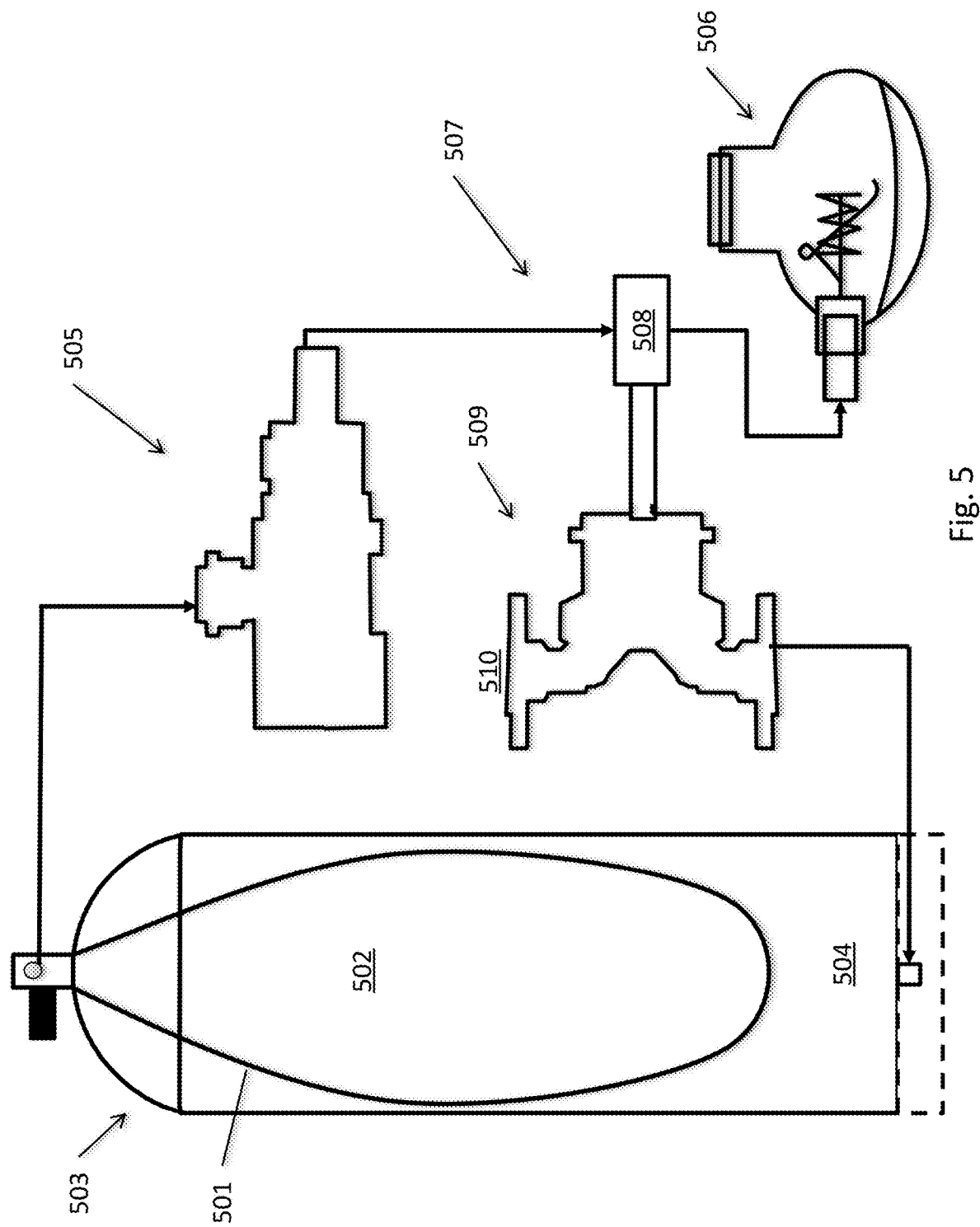
FIG. 5 is a schematic illustration of an example embodiment of the present invention.

FIG. 5 is a schematic illustration of an example embodiment of the present invention. The example embodiment comprises a pneumatic-hydraulic pump 507 installed between the intermediate-pressure outlet of the SCUBA regulator first stage 505 and the second stage 506. The example embodiment comprises a pressure vessel 503, in which a bladder 501 of rubber or other suitable material is disposed. Bladder 501 can contain a breathing gas mixture 502. A portion 504 of the pressure vessel 503 not occupied by the bladder 501 is available for containing pressurized water. High pressure air from the bladder is communicated to a SCUBA regulator's first stage 505. Intermediate pressure air from the first stage 505 is communicated to an air motor 508. The air motor 508 can comprise, as examples, a rotary vane motor, gear motor, swash plate or any other pneumatic means to power a pump. A water pump 509 accepts water 510 from the surroundings and pressurizes it for communication to the pressurized water portion 504 of the pressure vessel 503. The air drive and water pump can be configured so that a given mass of air transiting the air drive corresponds to an equal mass of water pumped into the pressure vessel, maintaining the desired buoyancy. Air from the air motor is communicated to a regulator. The first and second stages of the SCUBA regulator can be those known in the art, as examples any commonly used regulator, balanced or non-balanced, piston or diaphragm, etc. The water pump, diaphragm, and regulator can be as described above.

Figure 6:
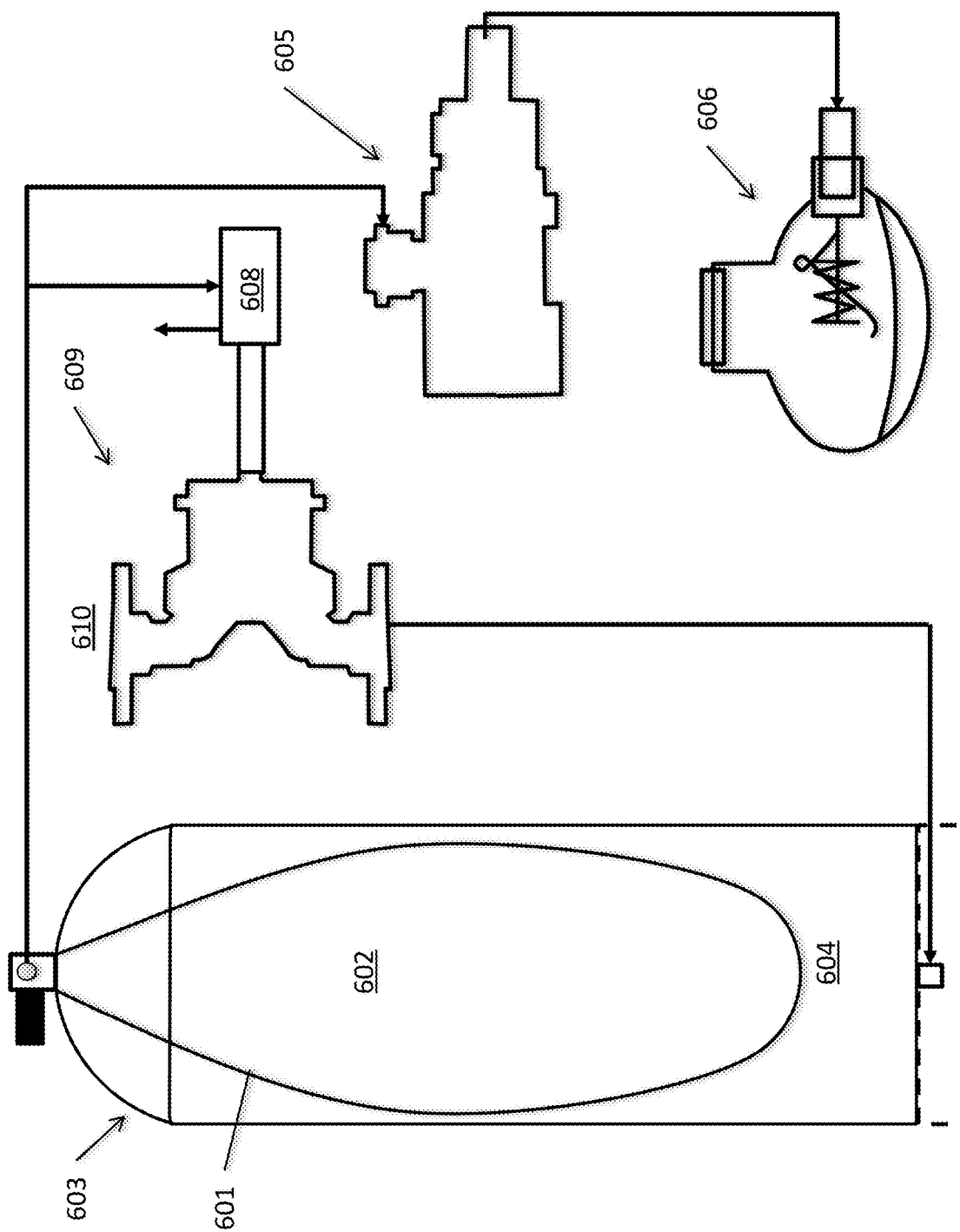
FIG. 6 is a schematic illustration of an example embodiment of the present invention.

FIG. 6 is a schematic illustration of an example embodiment of the present invention. The example embodiment comprises a pneumatic-hydraulic pump installed separately from SCUBA regulator. The example embodiment comprises a pressure vessel 603, in which a bladder 601 of rubber or other suitable material is disposed. Bladder 601 can contain a breathing gas mixture 602. A portion 604 of the pressure vessel not occupied by the bladder is available for containing pressurized water. High pressure air from the bladder is communicated to an air motor 608, and to a SCUBA regulator's first stage 605. The air motor 608 can comprise, as examples, a rotary vane motor, gear motor, swash plate or any other pneumatic means to power a pump. A water pump 609 accepts water 610 from the surroundings and pressurizes it for communication to the pressurized water portion 604 of the pressure vessel 603. The air drive and water pump can be configured so that a given mass of air transiting the air drive corresponds to an equal mass of water pumped into the pressure vessel, maintaining the desired buoyancy. The SCUBA regulator's first stage reduces the pressure of the air. Air from the first stage diaphragm is routed to a regulator 606. The diver's breathing in this embodiment is not used to operate the pump. The first and second stages of the SCUBA regulator can be those known in the art, as examples any commonly used regulator, balanced or non-balanced, piston or diaphragm, etc. The water pump, diaphragm, and regulator can be as described above.

Figure 7:
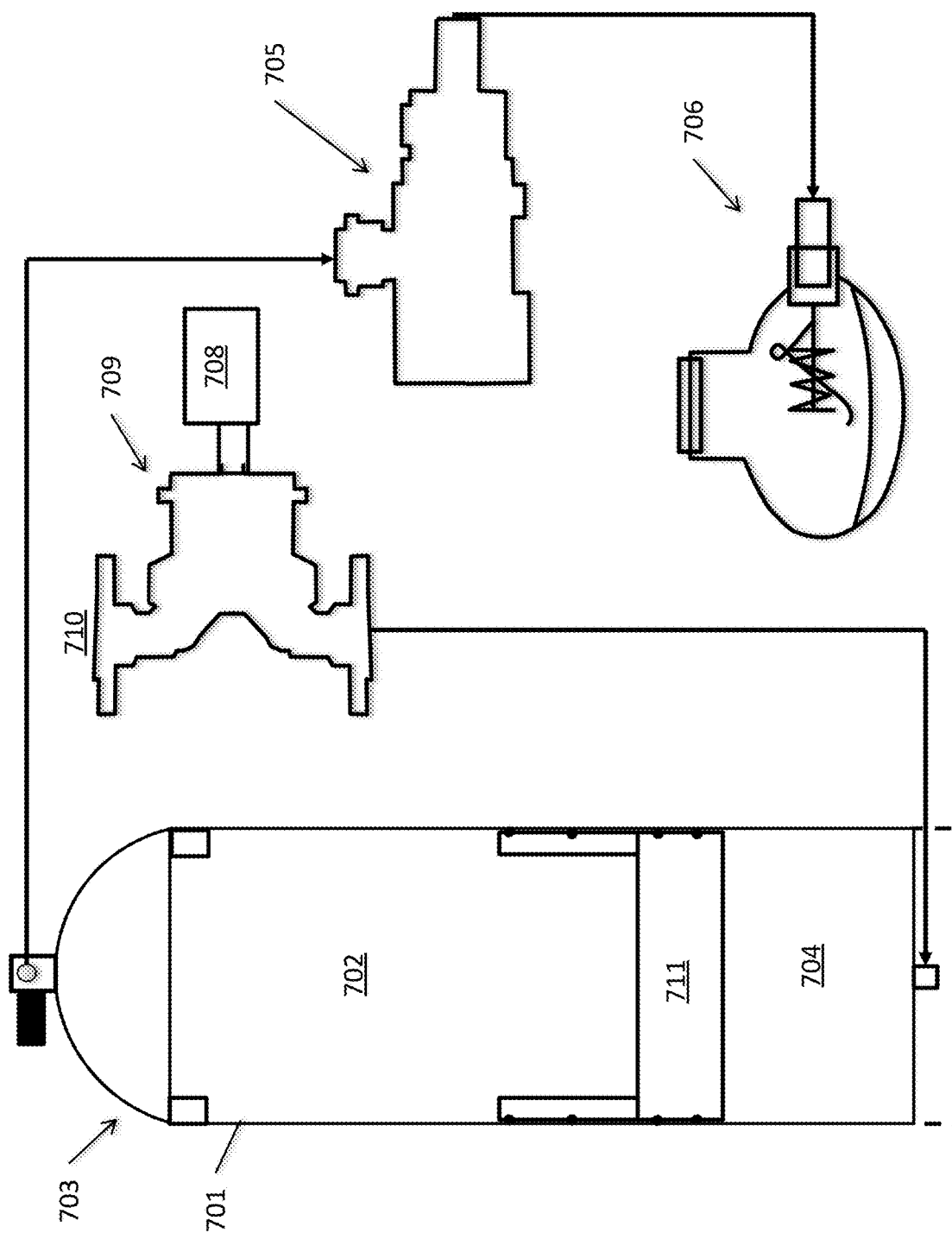
FIG. 7 is a schematic illustration of an example embodiment of the present invention.

FIG. 7 is a schematic illustration of an example embodiment of the present invention. The example embodiment comprises an electric pump drive 708. A pressure vessel 703 provides a portion 701 for a breathing gas mixture 702 and a portion 704 for pressurized water, separated by a rigid separator 711. The rigid separator in the example in the figure is slidable within the pressure vessel. High pressure air from the pressure vessel 703 is routed to a SCUBA regulator first stage 705, which reduces the pressure of the air. Air from the first stage diaphragm 705 is routed to a regulator 706. The diaphragm and regulator can be those known in the art, as examples any commonly used regulator, balanced or non-balanced, piston or diaphragm, etc. An electric motor 708 is powered by a source of energy such as a battery (not shown) and drives a water pump. The water pump 709 accepts water 710 from the surroundings and pressurizes it for communication to the pressurized water portion of the pressure vessel. A gas flow meter (not shown) mounted in communication with the air path between the first and second stages can be used to monitor the mass of gas leaving the pressure vessel 703. The gas flow meter can be used to determine control of the electric motor 708 that powers the pump. The electric motor 708 and water pump 709 can be configured so that a given mass of air transiting out of the pressure vessel 703 corresponds to an equal mass of water pumped into the pressure vessel, maintaining the desired buoyancy. The water pump, diaphragm, and regulator can be as described above.

Figure 8:
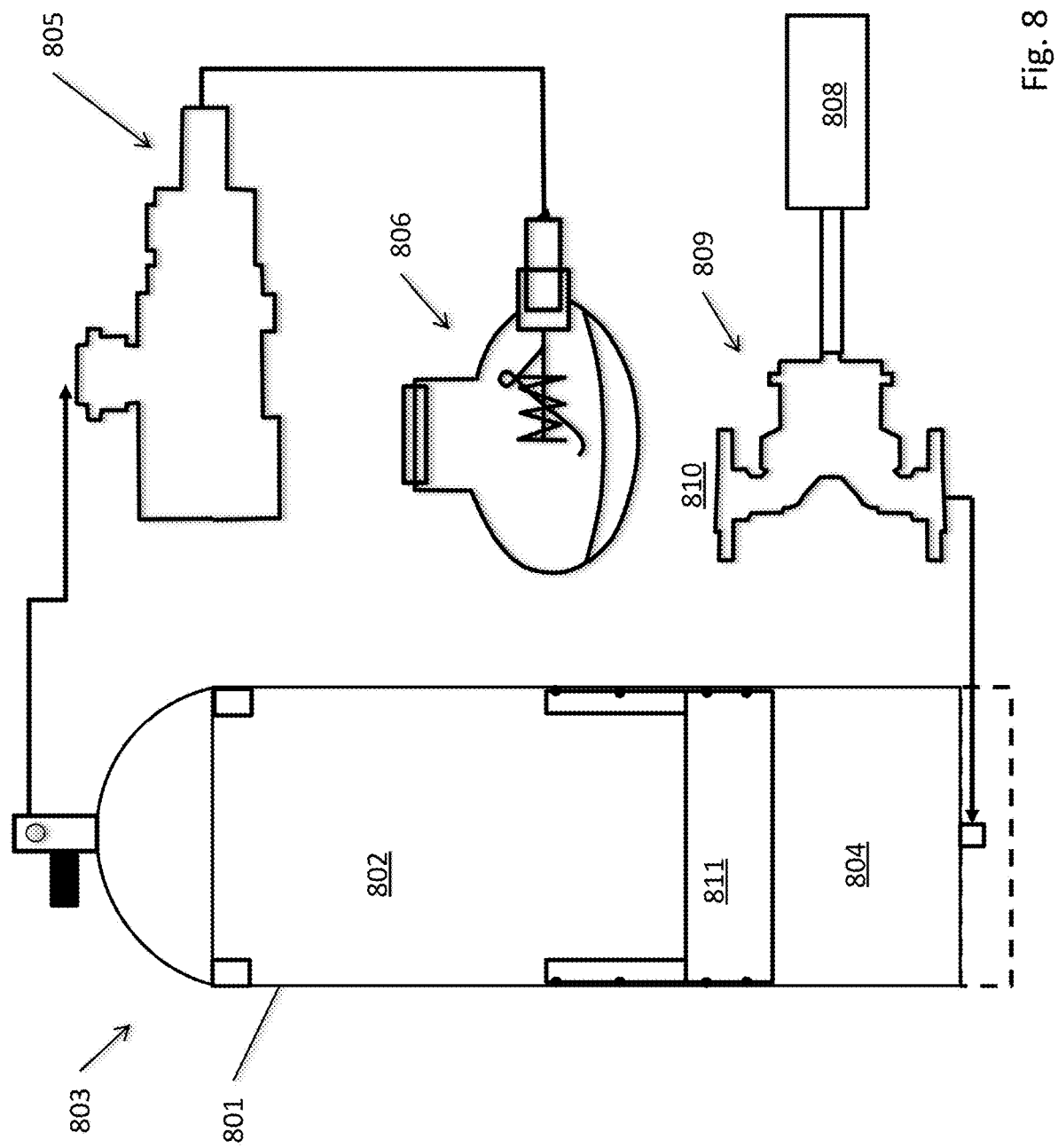
FIG. 8 is a schematic illustration of an example embodiment of the present invention.

FIG. 8 is a schematic illustration of an example embodiment of the present invention. The example embodiment comprises a manual hydraulic pump 808, 809 installed separately from SCUBA regulator. A pressure vessel 803 provides a portion 801 for a breathing gas mixture 802 and portion 804 for pressurized water, separated by a rigid separator 811. The rigid separator 811 in the example in the figure is slidable within the pressure vessel 803. High pressure air from the pressure vessel 803 is routed to a first stage 805 of the SCUBA regulator, which reduces the pressure of the air. Air from the first stage 805 is routed to a second stage regulator 806. The first and second stages of the SCUBA regulator can be those known in the art, as examples any commonly used regulator, balanced or non-balanced, piston or diaphragm, etc. A manually actuated drive 808 is powered by operation of the diver, for example by hand, arm, or leg motions, and drives a water pump 809. The water pump 809 accepts water 810 from the surroundings and pressurizes it for communication to the pressurized water portion of the pressure vessel. The diver can manually control the amount of water pumped into the vessel to maintain desired buoyancy. The water pump, diaphragm, and regulator can be as described above.

Figure 9:
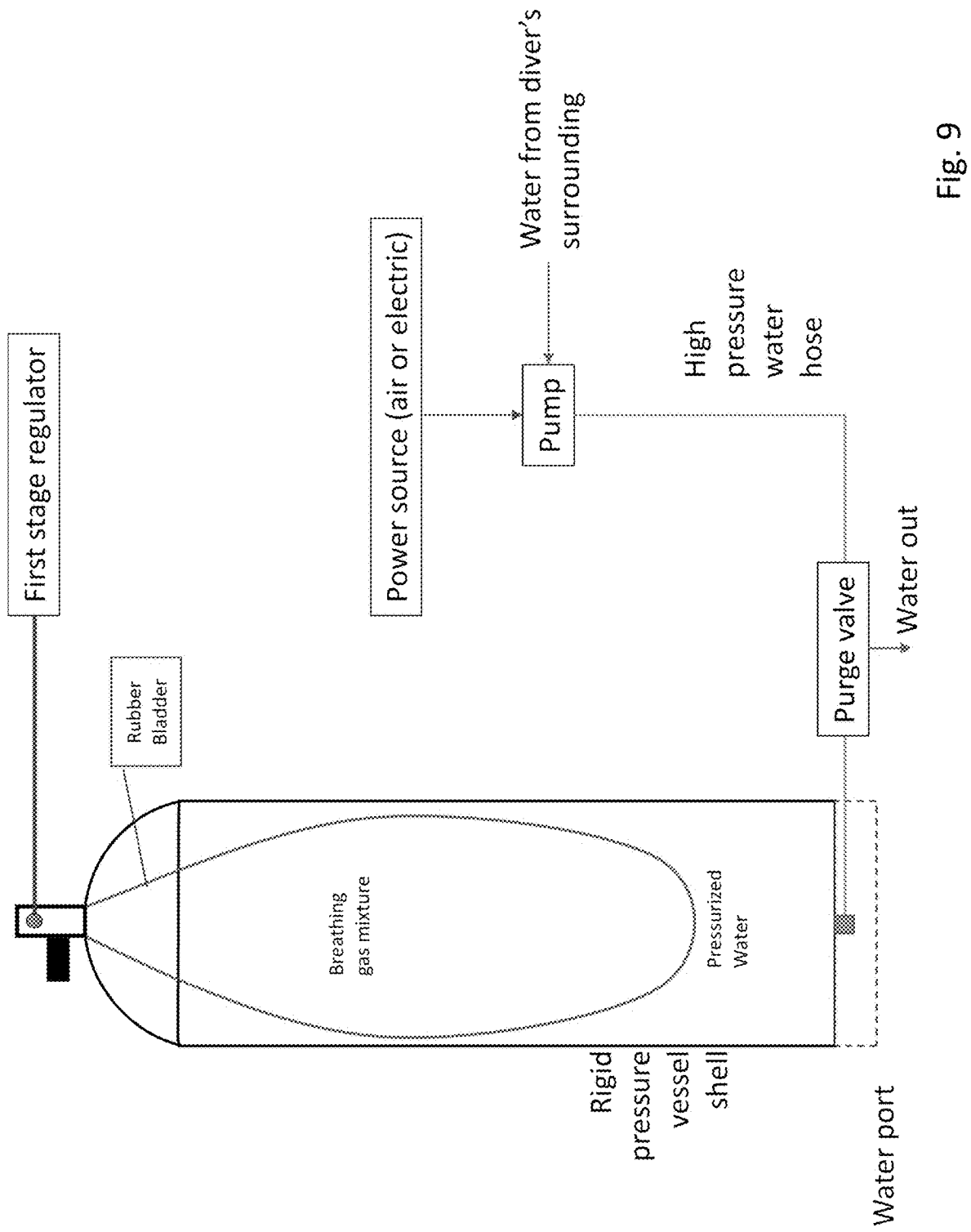
FIG. 9 is a schematic illustration of an example embodiment of the present invention.

FIG. 9 is a schematic illustration of an example embodiment of the present invention. A pressure vessel, similar to those described herein, connects to a regulator to communicate breathing gas from a breathing gas portion of the pressure vessel to the regulator for breathing by a diver. A pump receives power from a power source, e.g., electric or pneumatic, and pumps water from the diver's surrounding through a high pressure hose to a water port on the pressure vessel. The water port allows water to communicate between the pressure vessel and the high pressure hose. A purge valve is in communication with the pressure vessel—in the figure, the purge valve is connected with the high pressure water hose; the purge valve can also be connected directly to the pressure vessel. When it is desired to add mass to the water portion of the pressure vessel, the pump is controlled to pump water into the pressure vessel at a faster rate than water escapes via the purge valve, e.g., the purge valve can be completely closed while the pump is operating. When it is desired to remove mass from the water portion of the pressure vessel, the purge valve is configured to allow water to escape at a faster rate than water is introduced by the pump, e.g., the pump can be stopped while the purge valve is opened. When it is desired to maintain the mass in the water portion of the pressure vessel constant, the pump and purge valve can be configured such that the net water flow into or out of the pressure vessel is zero. E.g., the purge valve can be closed and the pump stopped.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A self-contained breathing apparatus incorporating an adjustable buoyancy system, configured for use with breathing gas while a user is submerged in a fluid, comprising: a vessel comprising an outer shell defining an interior volume; a dynamic partitioning element mounted within the interior volume separating the interior volume into a breathing gas portion configured to supply breathing gas to the user, and a fluid portion; a pump in fluid communication with the fluid portion of the vessel and having an inlet configured to accept fluid from water surrounding the user, configured to communicate fluid from the inlet into the fluid portion when the pump is active; a purge valve in fluid communication with the fluid portion of the vessel and with fluid surrounding the user, and configured to communicate fluid from the fluid portion to fluid surrounding the user when the purge valve is open.

2. The self-contained breathing apparatus of claim 1, wherein the dynamic partitioning element comprises a piston slidably mounted within the vessel, wherein motion of the piston causes a change in the volume of the fluid portion and a complementary change in the volume of the breathing gas portion.

3. The self-contained breathing apparatus of claim 1, wherein the dynamic partitioning element comprises a flexible bladder.

4. The self-contained breathing apparatus of claim 1, wherein the dynamic partitioning element comprises a flexible sheet mounted within the vessel and sealed to the vessel walls.

5. The self-contained breathing apparatus of claim 1, wherein the dynamic partitioning element is substantially impermeable to the breathing gas and to the fluid.

6. The self-contained breathing apparatus of claim 1, further comprising a meter configured to indicate the amount of breathing gas in the breathing gas portion of the vessel.

7. The self-contained breathing apparatus of claim 6, wherein the meter comprises a gas flow meter in fluid communication with the breathing gas portion of the vessel.

8. The self-contained breathing apparatus of claim 1, further comprising a pressure gauge in fluid communication with the breathing gas portion of the vessel.

9. The self-contained breathing apparatus of claim 1, further comprising a sensor indicative of the relative volumes of the breathing gas portion of the vessel and the fluid portion of the vessel.

10. The self-contained breathing apparatus of claim 9, wherein the sensor comprises a sensor mounted with the dynamic partitioning element.

11. The self-contained breathing apparatus of claim 1, further comprising an electrical energy storage device, and wherein the pump comprises an electric pump configured to accept energy from the electrical energy storage device.

12. The self-contained breathing apparatus of claim 1, further comprising a breathing gas regulator in fluid communication with the breathing gas portion of the vessel and configured to supply breathing gas at a regulated pressure to a user while submerged.

13. The self-contained breathing apparatus of claim 1, wherein the pump is configured such that the mass of liquid communicated into the fluid portion is in a pre-determined proportion to the mass of breathing gas removed from the breathing gas portion.

14. A self-contained breathing apparatus incorporating an adjustable buoyancy system, configured for use with breathing gas while a user is submerged in a fluid, comprising: a vessel comprising an outer shell defining an interior volume; a dynamic partitioning element mounted within the interior volume separating the interior volume into a breathing gas portion configured to supply breathing gas to the user, and a fluid portion; a manually actuated hydraulic in fluid communication with the fluid portion of the vessel and having an inlet configured to accept fluid, configured to communicate fluid from the inlet into the fluid portion; a purge valve in fluid communication with the fluid portion of the vessel and with fluid surrounding the user, and configured to communicate fluid from the fluid portion to fluid surrounding the user when the purge valve is open.

15. The self-contained breathing apparatus of claim 14, wherein the dynamic partitioning element comprises a flexible bladder.

16. The self-contained breathing apparatus of claim 14, wherein the dynamic partitioning element comprises a flexible sheet mounted within the vessel and sealed to the vessel walls.

17. The self-contained breathing apparatus of claim 14, further comprising a sensor indicative of the relative volumes of the breathing gas portion of the vessel and the fluid portion of the vessel.

18. The self-contained breathing apparatus of claim 17, wherein the sensor comprises a sensor mounted with the vessel responsive to the position of the dynamic partitioning element.

19. The self-contained breathing apparatus of claim 14, wherein the pump is configured such that the mass of liquid communicated into the fluid portion is in a pre-determined proportion to the mass of breathing gas removed from the breathing gas portion.

20. A self-contained breathing apparatus incorporating an adjustable buoyancy system, configured for use with breathing gas while a user is submerged in a fluid, comprising:

a vessel comprising an outer shell defining an interior volume; a dynamic partitioning element mounted within the interior volume separating the interior volume into a breathing gas portion configured to supply breathing gas to the user, and a fluid portion; a pump in fluid communication with the fluid portion of the vessel and having an inlet configured to accept fluid, configured to pump fluid from the inlet into the fluid portion; a purge valve in fluid communication with the fluid portion of the vessel and with fluid surrounding the user, and configured to communicate fluid from the fluid portion to fluid surrounding the user when the purge valve is open; a meter configured to indicate the amount of breathing gas in the breathing gas portion of the vessel, wherein the meter comprises a fluid flow meter mounted in fluid communication with the pump and with the fluid portion of the vessel, responsive to fluid flow through the pump.

\* \* \* \* \*